US005864588A

United States Patent [19]

Miyamoto

[11] Patent Number: 5,864,588

[45] Date of Patent: Jan. 26, 1999

[54] COMMUNICATIONS DEVICE

[75] Inventor: Taiyuu Miyamoto, Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 636,308

[22] Filed: Apr. 23, 1996

[30] Foreign Application Priority Data

Dec. 20, 1995 [JP] Japan .................................... 7-332028

[51] Int. Cl.[6] ............................ H04L 27/14; H04L 27/16

[52] U.S. Cl. ............................................ 375/326; 375/355

[58] Field of Search .................................... 375/324, 329, 375/330, 340, 346, 316, 326, 355

[56] References Cited

U.S. PATENT DOCUMENTS 5,259,000 11/1993 Kojima et al. .......................... 375/222

*Primary Examiner*—Chi H. Pham

*Assistant Examiner*—Bryan Webster

*Attorney, Agent, or Firm*—Leydig, Voit & Mayer

[57] ABSTRACT

A communications device, such as a non-contact IC card, demodulates a received carrier signal, which has been modulated with data to be transmitted thereto by changing the phase of the carrier signal intermittently according to the data, so as to extract the data from the carrier signal. The communications device includes a clock generating circuit for generating a clock signal from the carrier signal received, a demodulating circuit for demodulating the carrier signal received so that it extracts the data from the carrier signal and outputs the data, and for, when the phase of the carrier signal is varied, outputting a signal indicating a change in the phase of the carrier signal, a baud rate generator for resetting a frequency dividing process to restart the process of dividing the frequency of the clock signal from its initial state to generate a sampling signal when receiving the signal indicating a change in the phase of the carrier signal from the demodulating circuit, and a shift register for performing a sampling process on the data delivered by the demodulating circuit in accordance with the sampling signal.

6 Claims, 13 Drawing Sheets

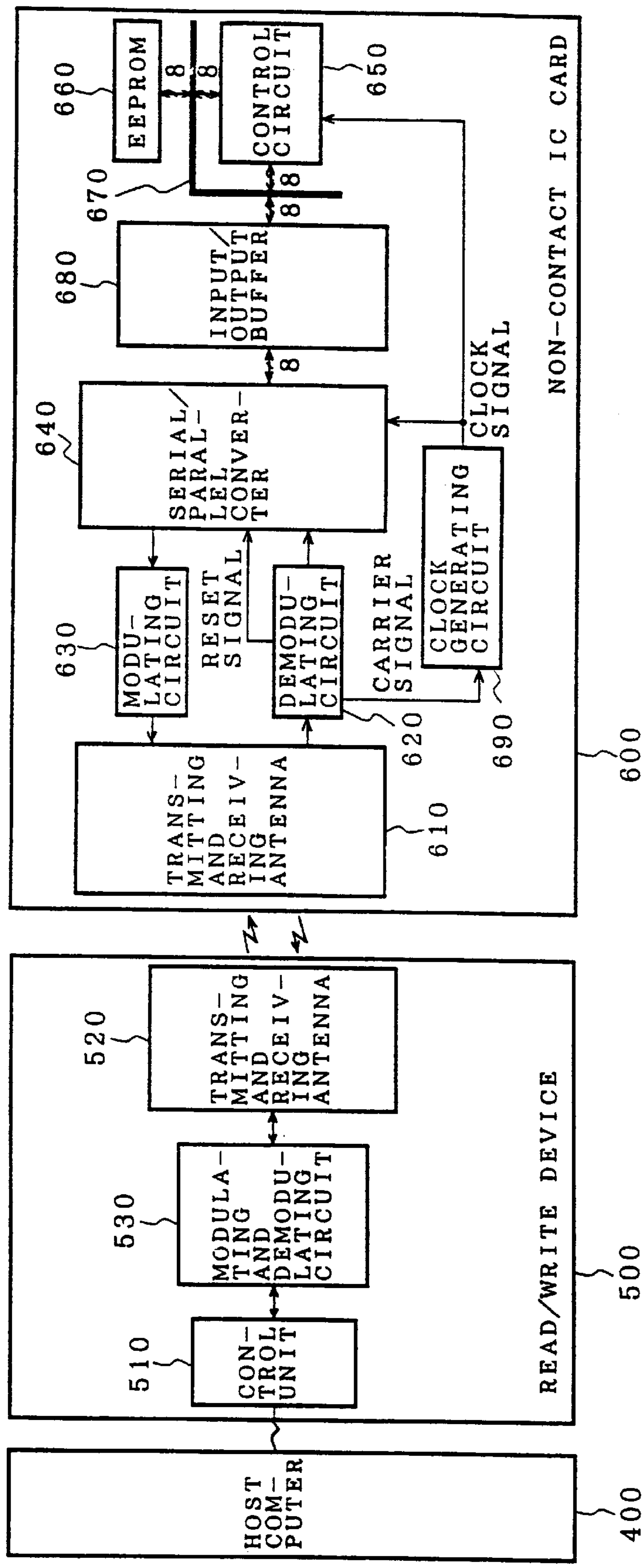
F I G . 1
NON-CONTACT IC CARD
600
EEPROM
660
CONTROL CIRCUIT
650
670
8
INPUT/OUTPUT BUFFER
680
SERIAL/PARALLEL CONVERTER
640
CLOCK SIGNAL
MODULATING CIRCUIT
630
RESET SIGNAL
DEMODULATING CIRCUIT
620
CARRIER SIGNAL
CLOCK GENERATING CIRCUIT
690
TRANSMITTING AND RECEIVING ANTENNA
610
READ/WRITE DEVICE
500
TRANSMITTING AND RECEIVING ANTENNA
520
MODULATING AND DEMODULATING CIRCUIT
530
CONTROL UNIT
510
HOST COMPUTER
400

CARRIER SIGNAL
692
690
691
CLOCK GENERATING CIRCUIT
DEMODULATING CIRCUIT
620
CLOCK SIGNAL
SERIAL
RESET SIGNAL
641
BAUD RATE GENERATOR
642
SHIFT REGISTER
SAMPLING SIGNAL
SERIAL/PARALLEL CONVERTER
640
8
8
OUTPUT BUFFER
681
INPUT BUFFER
682
INPUT/OUTPUT BUFFER
680
8
CONTROL CIRCUIT
650
670

BAUD RATE GENERATOR
CLOCK SELECTOR
906
901
902
903
904
905
Q
1/4
1/8
1/16
1/32
641
SAMPLING SIGNAL
CLOCK SIGNAL
RESET SIGNAL

CARRIER SIGNAL
Vcc
GND
-Vcc
CLOCK SIGNAL
DATA
SAMPLING SIGNAL
8
8
RESET SIGNAL (SIGNAL FOR INDICATING A CHANGE IN THE PHASE OF THE CARRIER SIGNAL)

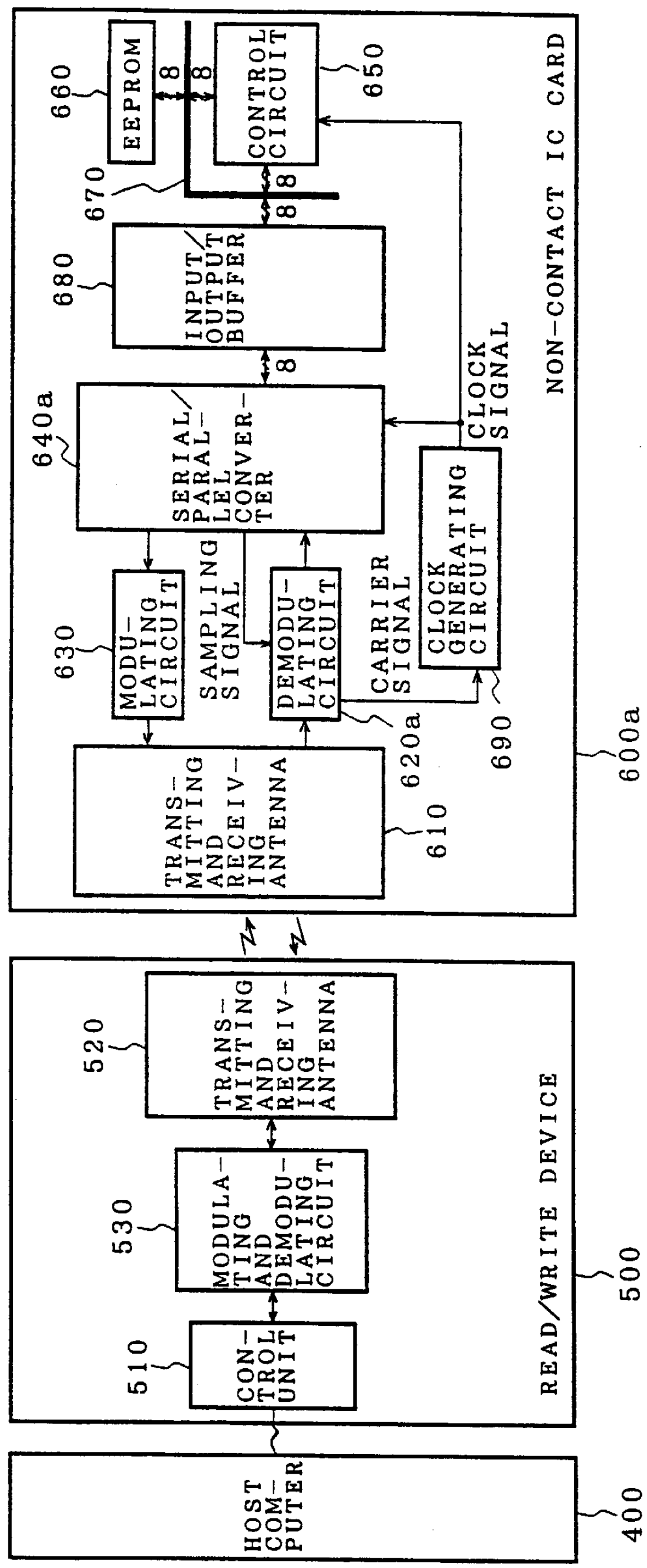
F I G . 5
NON-CONTACT IC CARD
600a
660
EEPROM
8
8
CONTROL CIRCUIT
650
670
8
8
680
INPUT/OUTPUT BUFFER
8
640a
SERIAL/PARAL-LEL CONVER-TER
CLOCK SIGNAL
630
MODU-LATING CIRCUIT
SAMPLING SIGNAL
DEMODU-LATING CIRCUIT
620a
CARRIER SIGNAL
CLOCK GENERATING CIRCUIT
690
TRANS-MITTING AND RECEIV-ING ANTENNA
610
520
TRANS-MITTING AND RECEIV-ING ANTENNA
530
MODULA-TING AND DEMODU-LATING CIRCUIT
510
CON-TROL UNIT
READ/WRITE DEVICE
500
HOST COM-PUTER
400

CARRIER SIGNAL
692
690
691
CLOCK GENERATING CIRCUIT
DEMODULATING CIRCUIT
620a
CLOCK SIGNAL
SERIAL
641
BAUD RATE GENERATOR
SAMPLING SIGNAL
642
SHIFT REGISTER
SERIAL/PARALLEL CONVERTER
640a
8
8
OUTPUT BUFFER
681
INPUT BUFFER
682
INPUT/OUTPUT BUFFER
680
8
670
CONTROL CIRCUIT
650

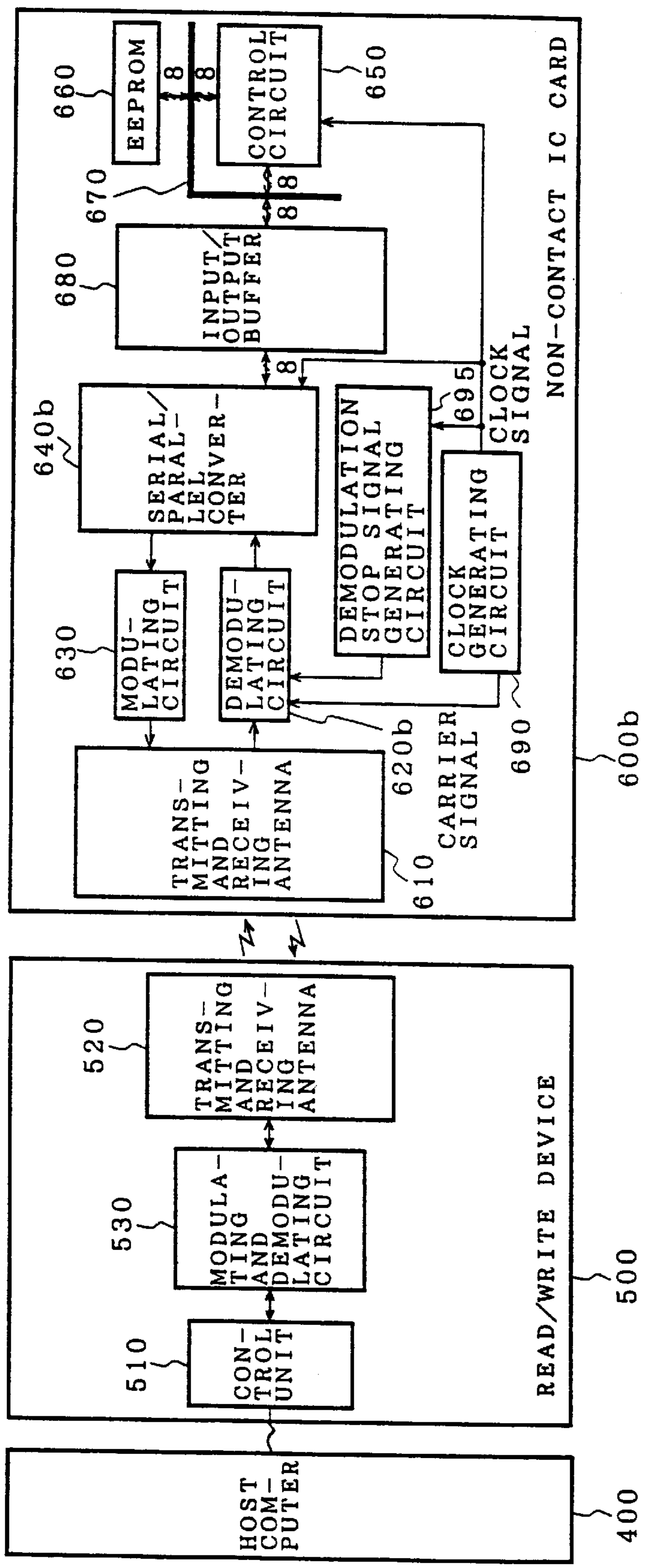
FIG. 9
NON-CONTACT IC CARD
600b
EEPROM
660
CONTROL CIRCUIT
650
670
8
INPUT/OUTPUT BUFFER
680
SERIAL/PARALLEL CONVERTER
640b
DEMODULATION STOP SIGNAL GENERATING CIRCUIT
695
CLOCK SIGNAL
CLOCK GENERATING CIRCUIT
690
MODULATING CIRCUIT
630
DEMODULATING CIRCUIT
620b
CARRIER SIGNAL
TRANSMITTING AND RECEIVING ANTENNA
610
READ/WRITE DEVICE
500
TRANSMITTING AND RECEIVING ANTENNA
520
MODULATING AND DEMODULATING CIRCUIT
530
CONTROL UNIT
510
HOST COMPUTER
400

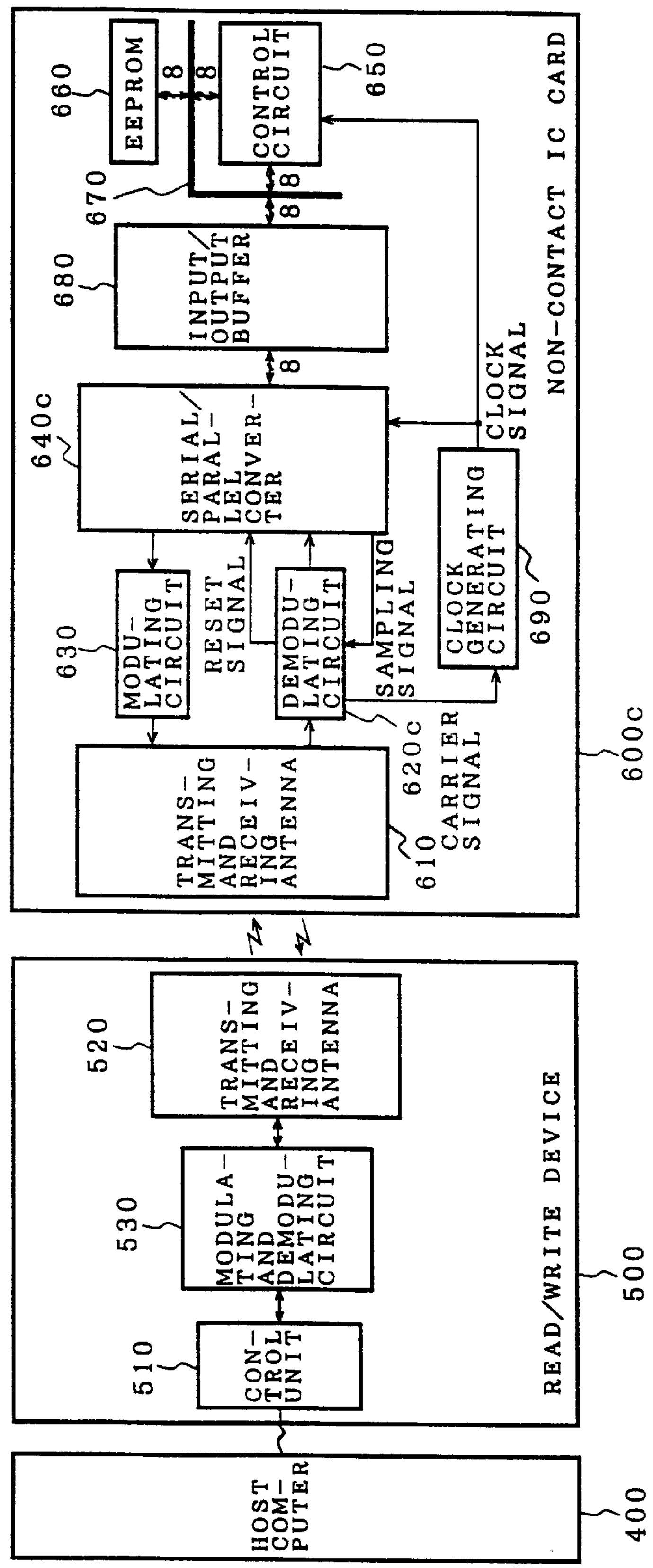
FIG. 10
HOST COMPUTER
400
CONTROL UNIT
510
MODULATING AND DEMODULATING CIRCUIT
530
TRANSMITTING AND RECEIVING ANTENNA
520
READ/WRITE DEVICE
500
TRANSMITTING AND RECEIVING ANTENNA
610
MODULATING CIRCUIT
630
DEMODULATING CIRCUIT
620c
RESET SIGNAL
SAMPLING SIGNAL
CARRIER SIGNAL
SERIAL/PARALLEL CONVERTER
640c
CLOCK GENERATING CIRCUIT
690
CLOCK SIGNAL
INPUT/OUTPUT BUFFER
680
670
EEPROM
660
CONTROL CIRCUIT
650
8
NON-CONTACT IC CARD
600c 392
390
391
CLOCK GENERATING CIRCUIT
DEMODULATING CIRCUIT
320
SERIAL
341
BAUD RATE GENERATOR
SAMPLING SIGNAL
SHIFT REGISTER
342
SERIAL/PARALLEL CONVERTER
340
8
8
OUTPUT BUFFER
381
INPUT BUFFER
382
INPUT/OUTPUT BUFFER
380
8
370
CONTROL CIRCUIT
350

COMMUNICATIONS DEVICE

BACKGROUND OF THE INVENTION

1. Field of the Invention

The present invention relates to a communications device such as a non-contact IC card used as, for example, a ski lift pass available in a skiing area.

2. Description of the Prior Art

Referring to FIG. 11, there is illustrate a block diagram showing the structure of a prior art non-contact IC card. In the figure, reference numeral 100 denotes a host computer, 200 denotes a read/write device, and 300 denotes the non-contact IC card. The read/write device 200 included a control unit 210 for controlling the operation of the read/write device 200 according to instructions from the host computer 100, a transmitting and receiving antenna 220, and a modulating and demodulating circuit 230 for modulating a carrier signal with digital data to be transmitted to the non-contact IC card 300 and for demodulating a signal transmitted from the non-contact IC card 300. The non-contact IC card 300 is provided with a transmitting and receiving antenna 310, a demodulating circuit 320 for demodulating a signal received through the transmitting and receiving antenna 310, a modulating circuit 330 for modulating a carrier signal with digital data to be transmitted, a serial/parallel converter 340 for converting a serial signal into parallel signals and for converting parallel signals into a serial signal, a control circuit 350 for controlling the operation of the non-contact IC card 300, an EEPROM 360 in which data or the like are stored, a bus 370 through which data is transferred between the circuits, an input/output buffer 380, and a clock generating circuit 390 for generating a clock signal from the carrier signal.

Next, a description of the operation of the prior art non-contact IC card. When the read/write device 200 receives an instruction to transmit predetermined data to the IC card 300 or the like from the host computer 100, the modulating and demodulating circuit 230 modulates the carrier signal using the predetermined data to be transmitted under the control of the control unit 210. The modulated carrier signal is radiated as a radio wave by the transmitting and receiving antenna 220. When the radio wave is received by the transmitting and receiving antenna 310 of the non-contact IC card 300, it causes a high-frequency signal to be generated in the antenna. Then, the high-frequency signal is delivered to the demodulating circuit 320 and is demodulated to extract the data from the high-frequency signal. The serial/parallel converter 340 converts the demodulated serial data into corresponding parallel signals. The control circuit 350 carries out a predetermined process in accordance with these demodulated parallel signals. An example of the process is a process of transmitting data stored in the EEPROM 360 to the read/write device 200. In this case, the control circuit 350 delivers the data stored in the EEPROM 360 in the form of parallel data to the serial/parallel converter 340 by way of the input/output buffer 380. The serial/parallel converter 340 converts the parallel data input thereto into corresponding serial data and then delivers them to the modulating circuit 330. The modulating circuit 330 modulates the carrier signal with the serial digital data. The modulated carrier signal is radiated as a radio wave by the transmitting and receiving antenna 310. When the read/write device 200 receives the radio wave, the modulating and demodulating circuit 230 demodulates the radio wave to extract the data therefrom. Then, the read/write device 200 carries out a predetermined process for the data.

Referring now to FIG. 12, there is illustrated a block diagram of the structures of the serial/parallel converter 340, input/output buffer 380, and clock generating circuit 390, which are disposed within the above-mentioned non-contact IC card 300. As shown in the figure, the serial/parallel converter 340 included a baud rate generator 341 for determining the data transmission rate and a shift register 342. The input/output buffer 380 includes an output buffer 381 and an input buffer 382. The clock generating circuit 390 includes a comparator 391 and an input terminal 392. The negative input terminal of the comparator 391 is connected to a ground point. When the non-contact IC card receives a signal, the baud rate generator 341 delivers a sampling signal for sampling a serial signal from the demodulating circuit 320 for each bit of the serial data to the shift register 342. Furthermore, when a carrier signal is applied to the input terminal 392, the comparator 391 generates a clock signal having "Low" levels which correspond to the negative half waves of the carrier signal and "High" levels which correspond to the positive half waves of the carrier signal.

Referring now to FIG. 13, examples of the carrier signal which is input to the demodulating circuit 320, clock signal which is output by the comparator 391, data which are output by the demodulating circuit 320, and sampling signal which is output by the baud rate generator 341 are illustrated. As shown in the figure, the carrier signal is modulated by using a BPSK(binary phase shift keying) modulation technique so that the phase of the carrier signal is varied for each bit of digital data to be carried by the carrier according to whether the bit of the data is in the "High" level or "Low" state. In the non-contact IC card 300, the comparator 391 of the clock generating circuit 390 generates a clock signal for controlling the internal operation of the IC card from the carrier signal. The clock signal generated is delivered to the baud rate generator 341 and the frequency of a sampling signal to be generated is determined. For example, when one bit of data corresponds to a 16-clock interval, the baud rate generator 341 causes the sampling signal to transition from its "Low" level to its "High" level or from its "High" level to its "Low" level every eight clocks. The shift register 342 latches the serial data transmitted from the demodulating circuit on the rising edges of the sampling signal. When all the eight bits of the data are latched, all the bits of the data are transferred in parallel with each other to the input buffer 382. The control circuit 350 retrieves the data stored in the input buffer 382 by way of the data bus 370 when necessary.

There is a case where when the phase of the carrier signal is varied, the waveform of the carrier signal is disturbed due to a bad propagation condition of a radio wave transmitted between the read/write device 200 and the non-contact IC card 300, as shown in FIG. 13, and hence one pulse is missing from the series of clock pulses in the clock signal. If such an omission takes place successively, the rising edges of the sampling signal lag behind the carrier signal. This causes a phenomenon in which the one bit of data which is latched during this state is unstable, or the next bit is latched. Thus, the problem is that, in such a case, an error is caused in the data transmission.

Furthermore, another problem is that, when the waveform of the received carrier signal is disturbed due to noise generated in the carrier signal other than a part thereof which corresponds to the first bit of data, or multipath, the demodulating circuit 320 makes the mistake of recognizing that the phase of the carrier signal has been varied by the modulation performed by the read/write device.

Since the prior art non-contact IC card is designed as described above, it suffers from the problem that an error in the data transmission is caused by an omission of a clock pulse, which occurs during generation of the clock signal and which is caused by a change in the phase of the carrier signal due to a bad propagation condition of the radio wave, or the wrong recognition of a change in the phase of the carrier signal which is caused by disturbance of the waveform of the carrier signal due to a bad propagation condition of the radio wave.

SUMMARY OF THE INVENTION

The purpose of the present invention is to overcome the above described disadvantages. More precisely, an object of the present invention is to provide a communications device capable of performing data transmission precisely even if a propagation condition in the transmission path becomes progressively worse.

In accordance with one aspect of the present invention, there is provided a communications device comprising a receiving unit for receiving a carrier signal phase-modulated with data; a clock generating unit for generating a clock signal used for internal operations of the communications device from the carrier signal received; a demodulating unit for demodulating the carrier signal received so that it extracts the data from the carrier signal and outputs the data, and for outputting a signal indicating a change in the phase of the carrier signal when the phase of the carrier signal is varied; a sampling signal generating unit for generating a sampling signal to sample the data by dividing the frequency of the clock signal generated by the clock generating unit, and for resetting the frequency dividing process to restart the process of dividing the frequency of the clock signal from its initial state to generate a sampling signal when the sampling signal generating unit receives the signal indicating a change in the phase of the carrier signal from the demodulating unit; and a sampling unit for performing a sampling process on the data delivered by the demodulating unit in accordance with the sampling signal.

In accordance with a preferred embodiment, the sampling unit samples a predetermined number bits of data, and after that the sampling unit converts them into parallel signals.

Preferably, the sampling signal generating unit is provided with a plurality of flip flops connected in series for dividing the frequency of the clock signal. Furthermore, the plurality of flip flops are reset to restart the process of dividing the frequency of the clock signal from its initial state to generate a sampling signal when the sampling signal generating unit receives the signal indicating a change in the phase of the carrier signal from the demodulating unit.

In accordance with another aspect of the present invention, there is provided a communications device comprising a receiving unit for receiving a carrier signal phase-modulated with data; a clock generating unit for generating a clock signal used for internal operations of the communications device from the carrier signal received; and a demodulating unit for demodulating the carrier signal received by detecting a change in the phase of the carrier signal so that it extracts the data from the carrier signal and outputs the data, the demodulating unit stopping the detection of a change in the phase of the carrier signal in a predetermined time period within a time period from when a predetermined time elapses after the demodulating unit has received the starting point of each bit of the data carried by the carrier signal until the demodulating unit receives the starting point of the next bit of the data carried by the carrier signal.

In accordance with a preferred embodiment, the communications device further comprises a sampling signal generating unit for generating a sampling signal to sample the data by dividing the frequency of the clock signal generated by the clock generating unit, and a sampling unit for performing a sampling process on the data delivered by the demodulating unit in accordance with the sampling signal. Furthermore, the demodulating unit determines the predetermined period in accordance with the sampling signal.

In accordance with a preferred embodiment, the communications device further comprises a demodulation stop signal generating unit for generating a signal indicating a period during which the detection of a change in the phase of the carrier signal is to be stopped, on the basis of the clock signal generated by the clock generating unit. Furthermore, the demodulating unit determines the predetermined period in accordance with the signal generated by the demodulation stop signal generating unit.

In accordance with a preferred embodiment, the sampling signal generating unit resets the frequency dividing process to restart the process of dividing the frequency of the clock signal from its initial state to generate a sampling signal when the sampling signal generating unit receives the signal indicating a change in the phase of the carrier signal from the demodulating unit.

Preferably, the sampling signal generating unit is provided with a plurality of flip flops connected in series for dividing the frequency of the clock signal. Furthermore, the plurality of flip flops are reset to restart the process of dividing the frequency of the clock signal from its initial state to generate a sampling signal when the sampling signal generating unit receives the signal indicating a change in the phase of the carrier signal from the demodulating unit.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram showing the structure of a non-contact IC card communications system according to a first embodiment of the present invention;

FIG. 5 is a block diagram showing the structure of a non-contact IC card communications system according to a second embodiment of the present invention;

FIG. 9 is a block diagram showing the structure of a non-contact IC card communications system which can generate the demodulation stop signal shown in FIG. 8;

FIG. 10 is a block diagram showing the structure of a non-contact IC card communications system according to a third embodiment of the present invention;

DETAILED DESCRIPTION OF THE PREFERRED EMBODIMENTS

Figure 2:
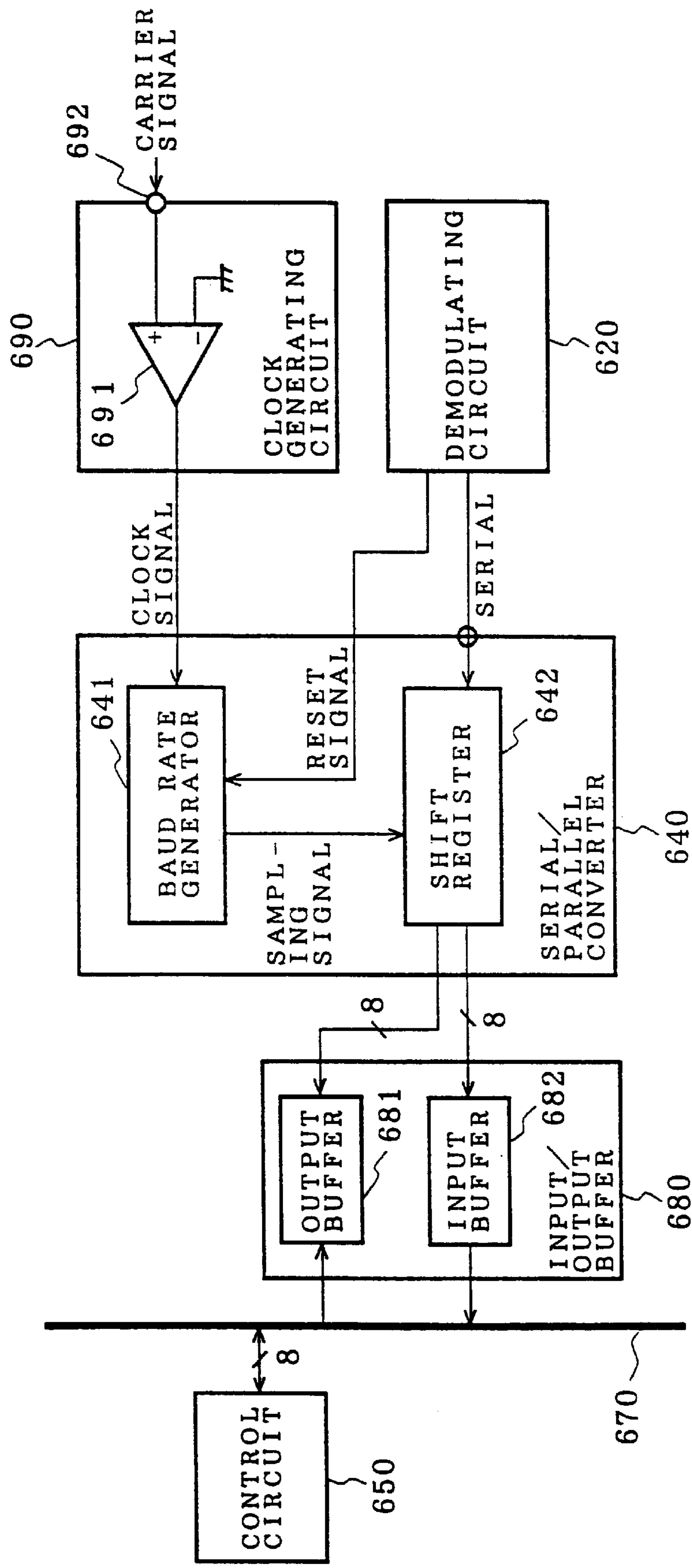
FIG. 2 is a block diagram showing the structures of an input/output buffer, a serial/parallel converter, and a clock generating circuit shown in FIG. 1.

A description will now be made of embodiments of the present invention. In each of the following embodiments, a non-contact IC card will be explained as an example of the communications device according to the present invention.

Referring now to FIG. 1, there is illustrated a block diagram of the structure of a non-contact IC card communications system according to a first embodiment of the present invention. In the figure, reference numeral 400 denotes a host computer, 500 denotes a read/write device which acts according to instructions from the host computer 400, and 600 denotes a non-contact IC card (a communications device) which performs data transmission between the read/write device 500 and itself by using a radio wave.

The read/write device 500 is provided with a control unit 510 for controlling the operation of the read/write device 500 according to instructions from the host computer 400, a transmitting and receiving antenna 520, and a modulating and demodulating circuit 530 for modulating a carrier signal with digital data to be transmitted to the non-contact IC card 600 and for demodulating a signal transmitted from the non-contact IC card 600.

The non-contact IC card 600 comprises a transmitting and receiving antenna (a receiving unit) 610, a demodulating circuit (a demodulating unit) 620 for demodulating a signal received through the transmitting and receiving antenna 610, a modulating circuit 630 for modulating a carrier signal with digital data to be transmitted, a serial/parallel converter (a sampling signal generating unit and a sampling unit) 640 for converting a serial signal into parallel signals and for converting parallel signals into a serial signal, a control circuit 650 for controlling the operation of the non-contact IC card 600, an EEPROM 660 in which data or the like are stored, a bus 670 through which data are transferred between the circuits, an input/output buffer 680, and a clock generating circuit (a clock generating unit) 690 for generating a clock signal.

Next, a description of to the operation of the non-contact IC card communications system according to this embodiment. First, a description will be made as to a process of verifying information about the ID and expiration date of an non-contact IC card 600. The read/write device 500 performs the verifying process in accordance with an instruction from the host computer 400. When the read/write device 500 receives the instruction from the host computer 400, the modulating and demodulating circuit 530 modulates a carrier signal using a command for reading the ID and expiration date data from the non-contact IC card 600, under the control of the control unit 510. The carrier signal modulated with the command is radiated as a radio wave by the transmitting and receiving antenna 520. When the radio wave is received by the transmitting and receiving antenna 610 of the non-contact IC card 600, it causes a high-frequency signal to be generated in the antenna. Then, the high-frequency signal is delivered to the demodulating circuit 620 and is demodulated to extract the command from the high-frequency signal. The serial/parallel converter 640 converts the demodulated command into corresponding parallel command signals. Then, they are delivered to the input/output buffer 680. The control circuit 650 carries out a process of transmitting the ID and expiration date data stored in the EEPROM 660 in accordance with these demodulated parallel command signals. In this case, the control circuit 650 delivers the ID and expiration date data stored in the EEPROM 660 in the form of parallel data to the serial/parallel converter 640. The serial/parallel converter 640 converts the parallel data input thereto into corresponding serial data and then delivers the data to the modulating circuit 630. The modulating circuit 630 modulates the carrier signal with the serial data on the ID and expiration date of the non-contact IC card. The modulated high-frequency carrier signal is radiated as a radio wave by the transmitting and receiving antenna 610. When the read/write device 500 receives the radio wave, the modulating and demodulating circuit 530 demodulates the radio wave to extract the data on the ID and expiration date of the non-contact IC card 600 therefrom. The data are transferred to the host computer 400 from the read/write device 500. Then, the host computer performs a process of verifying the ID against a list of available IDs or the like and a process of checking the expiration date data. The results of the ID verification and expiration date data check are displayed on the screen of the host computer 400. The frequencies of the carrier signals are in the range from 125 KHz to 4 MHz. Communications between the read/write device 500 and the non-contact IC card 600 are carried out so that the frequencies of the carrier signals emitted out of the read/write device 500 and non-contact IC card 600 are the same.

Referring now to FIG. 2, there is a block diagram showing the structures of the input/output buffer 680 the, serial/parallel converter 640, and the clock generating circuit 690 shown in FIG. 1. The same elements as those shown in FIG. 1 are designated by the same reference numerals, and a description thereof is omitted hereinafter. As shown in the figure, the input/output buffer 680 comprises an output buffer 681 and an input buffer 682. The serial/parallel converter 640 comprises with a baud rate generator (a sampling signal generating unit) 641 and a shift register (a sampling unit) 642. The clock generating circuit 690 comprises a comparator 691 and an input terminal 692. The negative input terminal of the comparator 691 is connected to a ground.

When the IC card receives a signal, the baud rate generator 641 delivers a sampling signal for sampling a serial signal from the demodulating circuit 620 for each bit of the serial data. When a carrier signal delivered by the demodulating circuit 620 is applied to the input terminal 692 of the comparator 691, the comparator 391 converts the carrier signal into a clock signal having "Low" levels which correspond to the negative half waves of the carrier signal and "High" levels which correspond to the positive half waves of the carrier signal. Furthermore, the demodulating circuit 620 is adapted to output a reset signal which is active low, i.e., a signal for indicating a change in the phase of the carrier signal to the baud rate generator 641 when the demodulating circuit 620 detects a change in the phase of the carrier signal.

Figure 3:
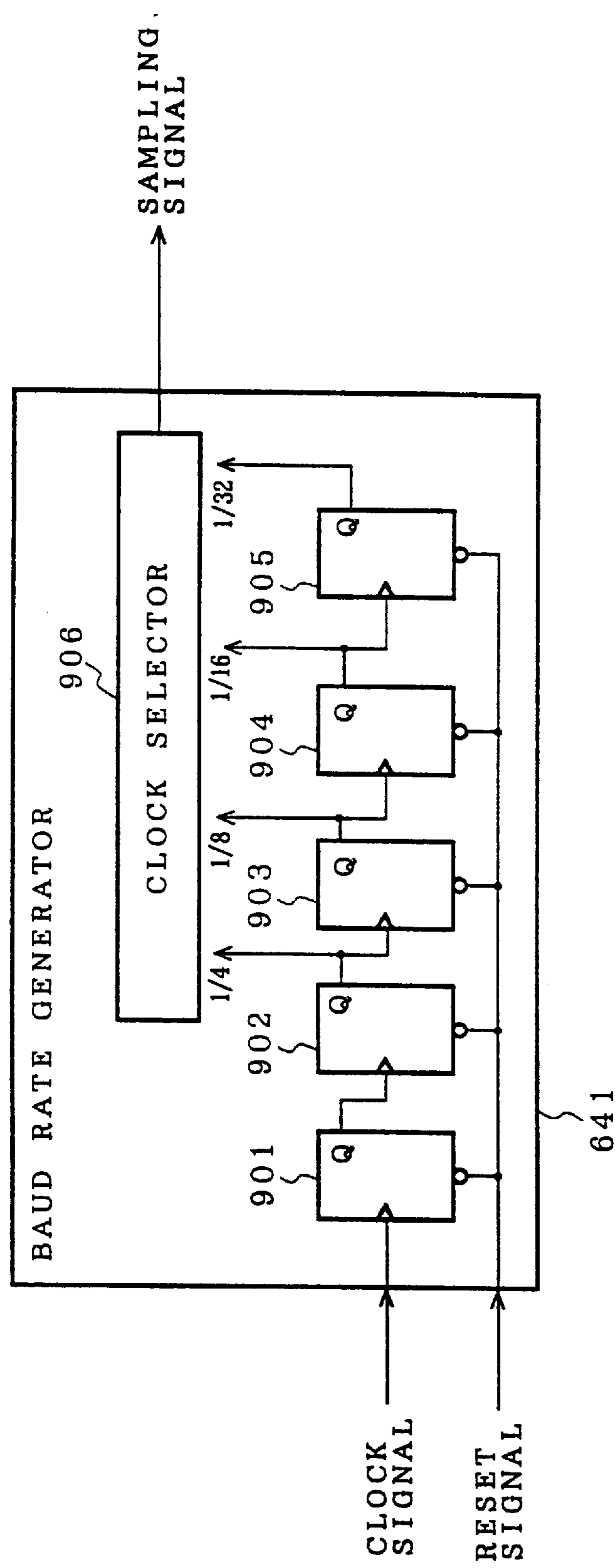
FIG. 3 illustrates the structure of a baud rate generator shown in FIG. 2.

Referring now to FIG. 3, there is shown the structure of the baud rate generator 641 shown in FIG. 2. In the figure, reference numerals 901 to 905 denote flip flops connected in series, and 906 denotes a clock selector. Each of the flip flops 901 to 905 includes a reset input terminal. When a reset signal, which is active low, from the demodulating circuit 620 is input to the flip flops, all the flip flops 901 to 905 are reset at the same time and output "Low" level signals, respectively. When necessary, the clock selector 906 selects from among the output of the flip flop 902 the output of the flip flop 903 the output of the flip flop 904, and the output of the flip flop 905, so as to output it as a sampling signal. Thus, the frequency of the sampling signal can be any one of ¼, ⅛, 1/16, and 1/32 of the frequency of the clock signal. In this case, when the frequency of the carrier signal is for example 4 MHz, the data transmission rate can be 1 Mbps, 500 Kbps, 250 Kbps, or 125 Kbps according to the decreasing frequency of the sampling signal.

Figure 4:
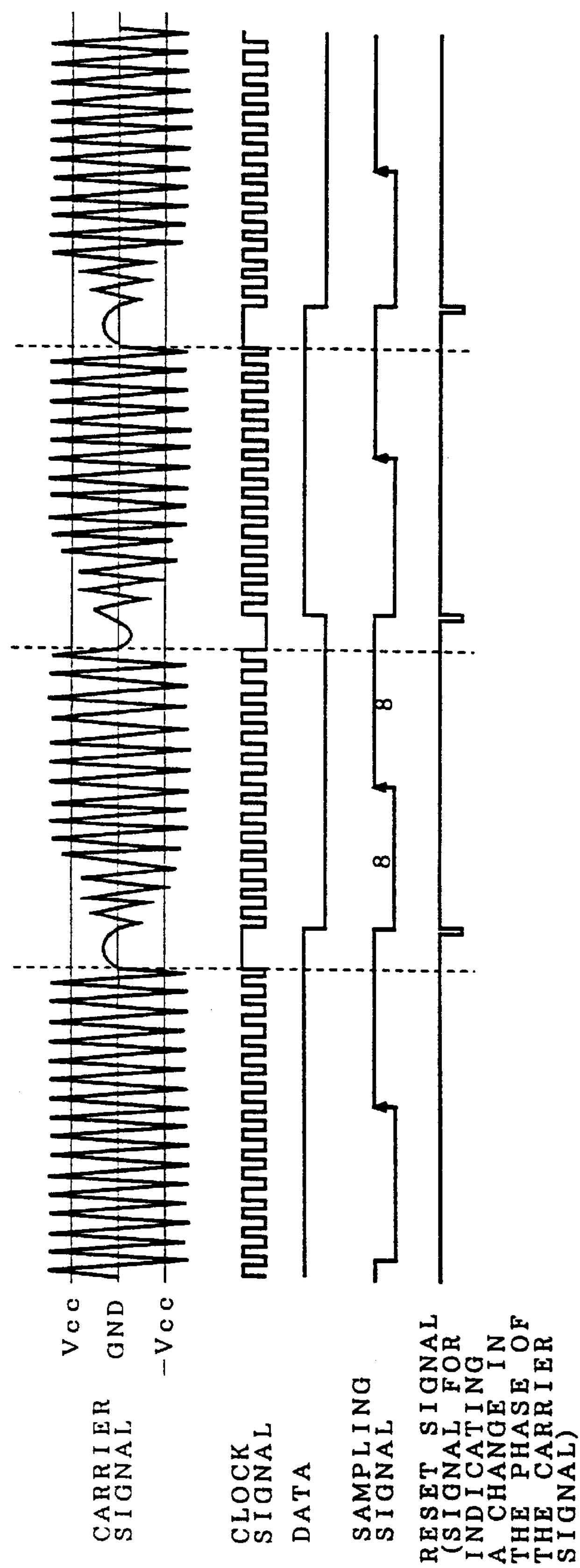
FIG. 4 illustrates examples of a carrier signal which is input to a demodulating circuit, a clock signal which is output by a comparator, data which are output by the demodulating circuit, a sampling signal which is output by the baud rate generator, and a reset signal which is output by the demodulating circuit, in the non-contact IC card of the first embodiment.

Referring now to FIG. 4, examples are illustrate of the carrier signal which is input to the demodulating circuit 620 the clock signal which is output by the comparator 691 the data which are output by the demodulating circuit 620 the sampling signal which is output by the baud rate generator 641, and the reset signal which is output by the demodulating circuit 620. As shown in the figure, the received carrier signal has been modulated using the BPSK modulation technique so that the phase of the carrier signal is varied every bit according to the level of each bit of digital data carried by the carrier signal. In the non-contact IC card 600, the comparator 691 generates a clock signal for controlling the internal operation of the IC card from the carrier signal. The clock signal generated is delivered to the baud rate generator 641 and the frequency of a sampling signal to be generated is determined. For example, when one bit of data corresponds to a 16-clock interval, the baud rate generator 641 causes the sampling signal to transition from its "Low" level to its "High" level or from its "High" level to its "Low" level every eight clocks. The shift register 642 latches the serial data transmitted from the demodulating circuit on the rising edges of the sampling signal. When all of the eight bits of the data are latched, all of the bits of the data are transferred in parallel with each other to the input buffer 682. The control circuit 650 retrieves the data stored in the input buffer 682 by way of the data bus 670 when necessary, for example, in order to respond to the instruction for verifying the ID and for checking the expiration date from the read/write device.

In this embodiment, when the demodulating circuit 620 detects a change in the phase of the carrier signal received, it delivers a reset signal which is active low to the baud rate generator 641. When the baud rate generator 641 receives the reset signal, all the flip flops 901 to 905 in the baud rate generator are reset and then output "Low" level signals, respectively. Thus, the counting operation of the baud rate generator 641 is placed in its initial state so that the baud rate generator restarts the counting operation. Accordingly, the sampling signal makes a Low to High level transition after eight clock pulses have been continuously generated following the detection of a change in the phase of the received carrier signal, which takes place between bits of the digital data carried by the carrier signal, by the demodulating circuit 620. That is, the frequency dividing process for the clock signal is reset in the baud rate generator 641 when a phase change of the carrier signal between bits of the data carried by the carrier signal is detected and after a predetermined time has elapsed, a sampling signal is regenerated for sampling one bit of the data.

As previously mentioned, according to the first embodiment, since the frequency dividing process for the clock signal is reset in the baud rate generator 641 when a phase change of the carrier signal takes place between bits of digital data carried by the carrier signal and after a predetermined time has elapsed, a sampling signal is regenerated for sampling one bit of the data, there is an advantage recognized in that a data transmission error hardly occurs even if an omission of a clock pulse takes place successively due to a bad propagation condition of the radio wave and hence data transmission is carried out precisely.

Referring now to FIG. 5, there is illustrated a block diagram showing the structure of a non-contact IC card communications system according to a second embodiment of the present invention. In the figure, reference numeral 600*a* denotes a non-contact IC card (a communications device), 620*a* denotes a demodulating circuit (a demodulating unit) for performing a demodulation operation on a BPSK signal, and 640*a* denotes a serial/parallel convertor (a sampling signal generating unit and a sampling unit) functions to output a sampling signal to the demodulating circuit 620*a*. The same elements as those shown in FIG. 1 are designated by the same reference numerals, and therefore the a description of these elements is omitted. The demodulating circuit 620*a* is provided with a function of temporarily stopping the detecting process of detecting a change in the phase of the carrier signal during the whole time the sampling signal output from the serial/parallel convertor 640*a* is in the "Low" state.

Figure 6:
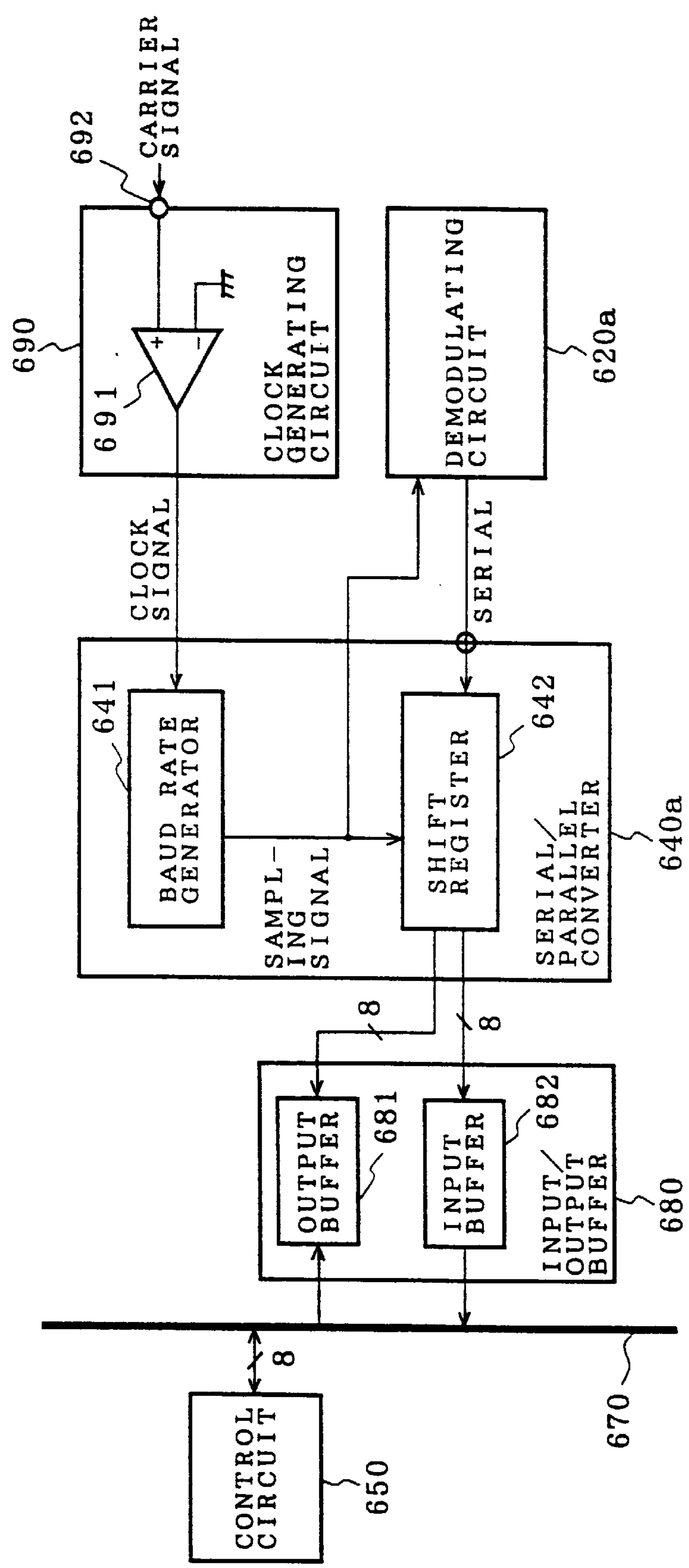
FIG. 6 is a block diagram showing the structures of an input/output buffer, a serial/parallel converter, and a clock generating circuit shown in FIG. 5.

Referring now to FIG. 6, there is illustrated a block diagram showing the structures of the input/output buffer 680 the serial/parallel converter 640*a*, and the clock generating circuit 690 shown in FIG. 5. The same elements as those shown in FIG. 5 are designated by the same reference numerals, and a description of these elements is omitted. As shown in FIG. 6, the serial/parallel convertor 640*a* function to output a sampling signal to the demodulating circuit 620*a*.

Figure 7:
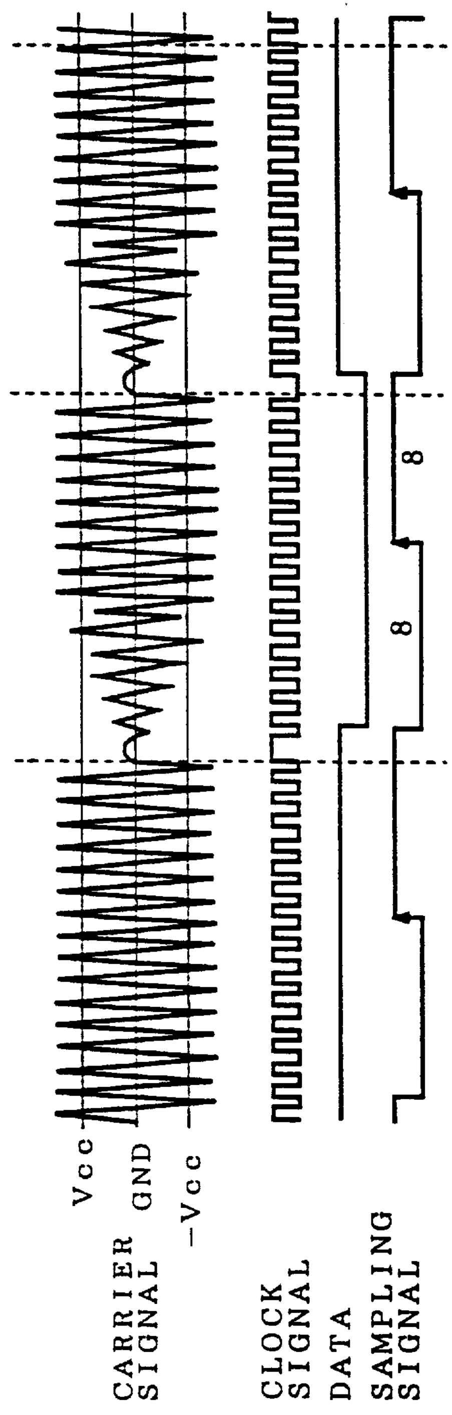
FIG. 7 illustrate examples of a carrier signal which is input to a demodulating circuit, a clock signal which is output by a comparator, data which are output by the demodulating circuit, and a sampling signal which is output by a baud rate generator, in the non-contact IC card of the second embodiment.

Next, the description will be directed to the operation of the non-contact IC card communications system of the second embodiment. FIG. 7 illustrates examples of the carrier signal which is input to the demodulating circuit 620*a* the clock signal which is output by the comparator 691 the data which are output by the demodulating circuit 620*a*, and the sampling signal which is output by the baud rate generator 641.

As shown in the figure, the received carrier signal has been modulated using the BPSK modulation technique so that the phase of the carrier signal is varied every bit according to the level of each bit of digital data carried by the carrier signal. In the non-contact IC card 600*a*, the comparator 691 generates a clock signal for controlling the internal operation of the non-contact IC card from the carrier signal. The clock signal generated is delivered to the baud rate generator 641 and the frequency of a sampling signal to be generated is determined. For example, when one bit of data corresponds to a 16-clock interval, the baud rate generator 641 causes the sampling signal to transition from its "Low" level to its "High" level or from its "High" level to its "Low" level every eight clocks. The shift register 642 latches the serial data transmitted from the demodulating circuit 620*a* on the rising edges of the sampling signal. When all the eight bits of data are latched, all the bits of the data are transferred in parallel with each other to the input buffer 682. The control circuit 650 retrieves data stored in the input buffer 682 by way of the data bus 670 when necessary, for example, in order to respond to the instruction for verifying the ID and for checking the expiration date from the read/write device. The demodulating circuit 620*a* temporarily stops the detecting process of detecting a change in the phase of the carrier signal during the whole time the sampling signal output out of the baud rate generator 641 is in the "Low" state. Thus, it is possible to prevent wrong recognition that a phase change in the carrier signal, which has been actually caused for example, a noise which occurred in the sampling signal when the sampling signal was in the "Low" level, has been caused by a phase modulation.

As mentioned above, the non-contact IC card is designed so as not to detect a change in the phase of the received carrier signal during the whole time the sampling time is in the "Low" level. Alternatively, the non-contact IC card can be adapted to generate a demodulation stop signal, as shown in FIG. 8, for example, the clock pulse delivered by the comparator 691, and to temporarily stop the detection of a change in the phase of the carrier signal, which is to be carried out by the demodulating circuit 620*a,* during the whole time the demodulation stop signal is in the "Low" level, i.e., in the time period from when a predetermined time elapses after the demodulating circuit has received the starting point of a bit of data carried by the carrier signal until immediately before the demodulating circuit receives the next bit of the data carried by the carrier signal.

Figure 8:
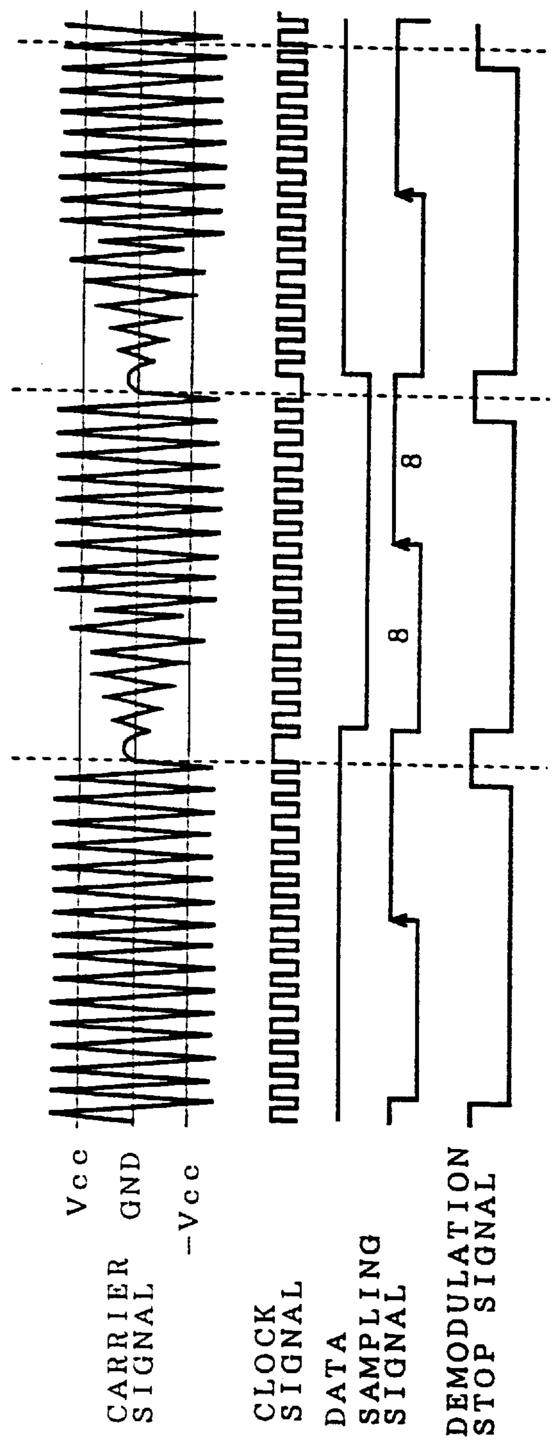
FIG. 8 illustrate examples of a carrier signal which is input to a demodulating circuit, a clock signal which is output by a comparator, data which are output by the demodulating circuit, a sampling signal which is output by a baud rate generator, and a demodulation stop signal, in the non-contact IC card according a variant of the second embodiment.
Figure 11:
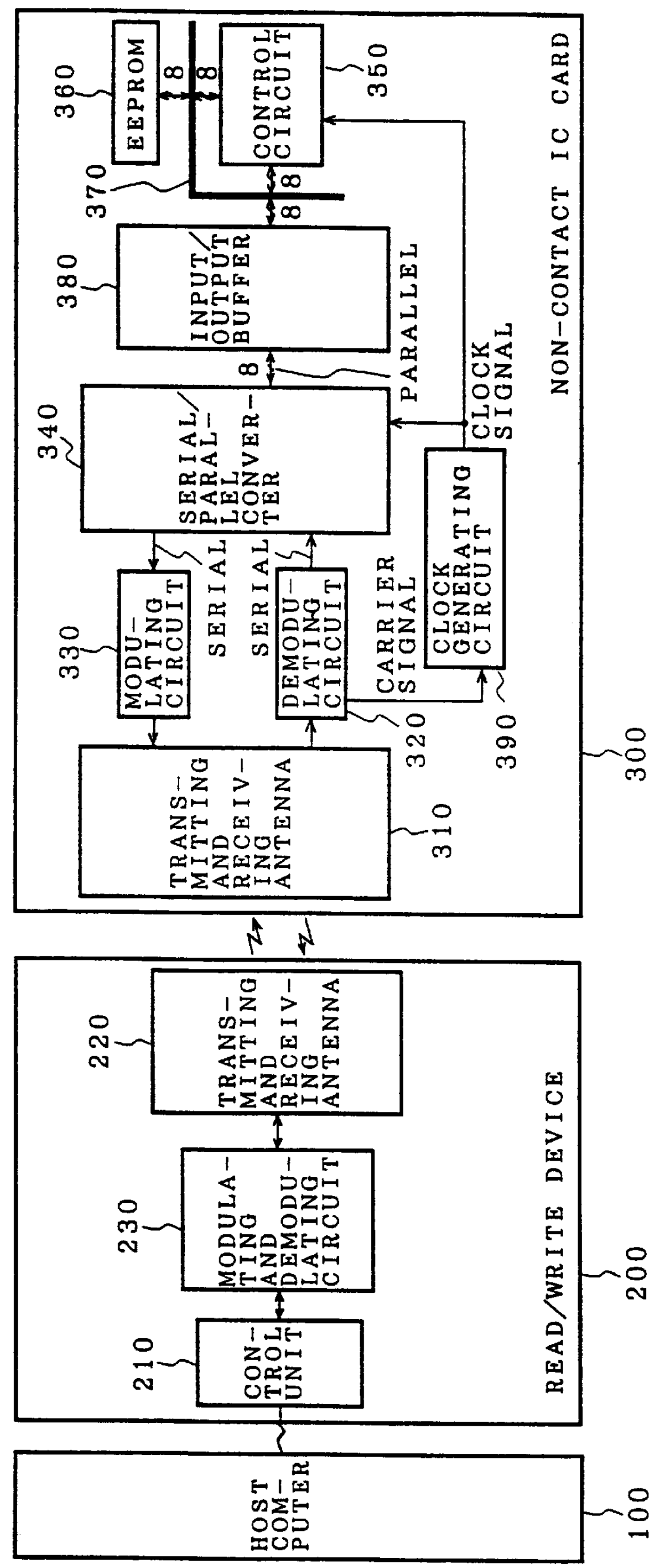
FIG. 11 is a block diagram showing the structure of a prior art non-contact IC card communications system.
Figure 12:
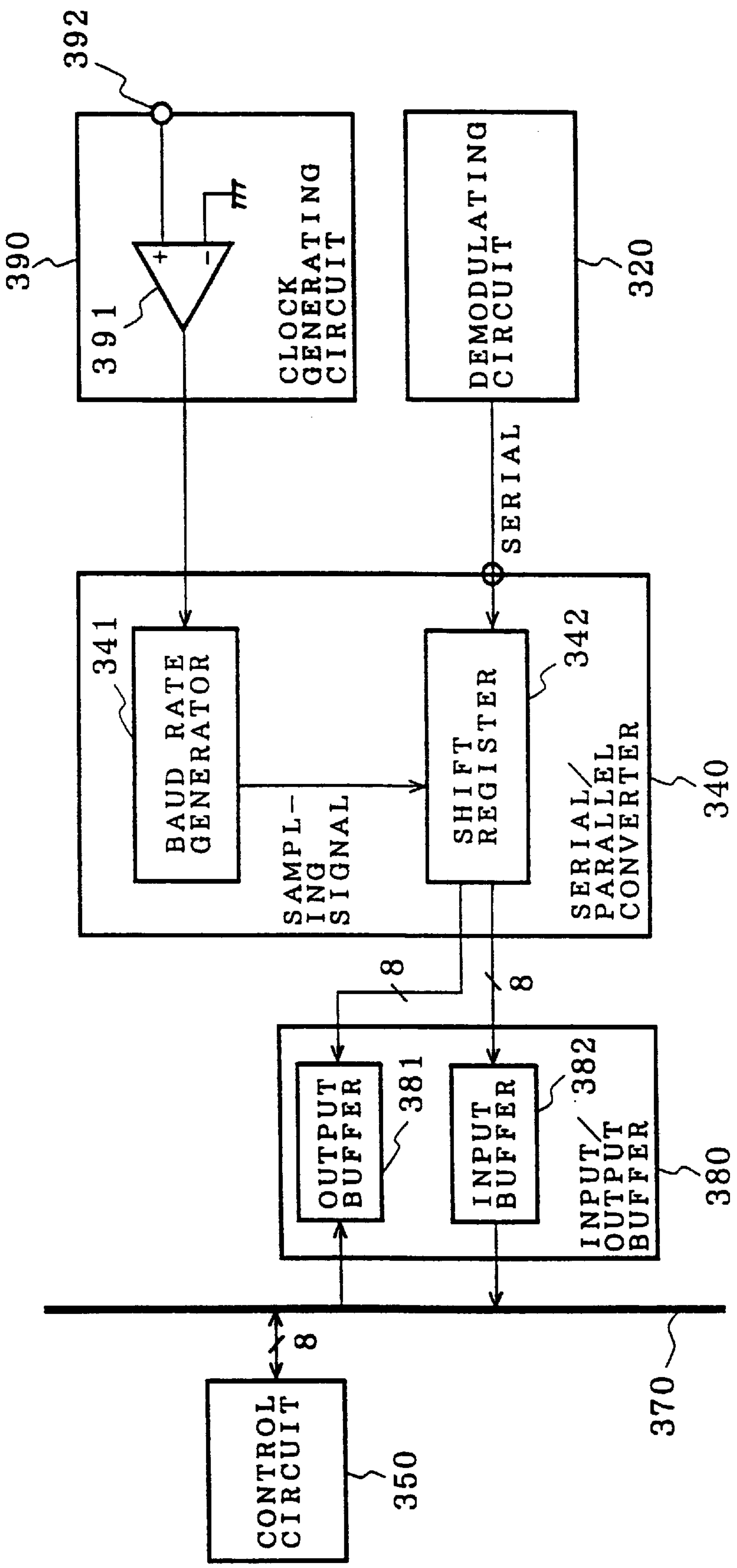
FIG. 12 is a block diagram showing the structures of a serial/parallel converter, an input/output buffer, and a clock generating circuit in a prior art non-contact IC card.
Figure 13:
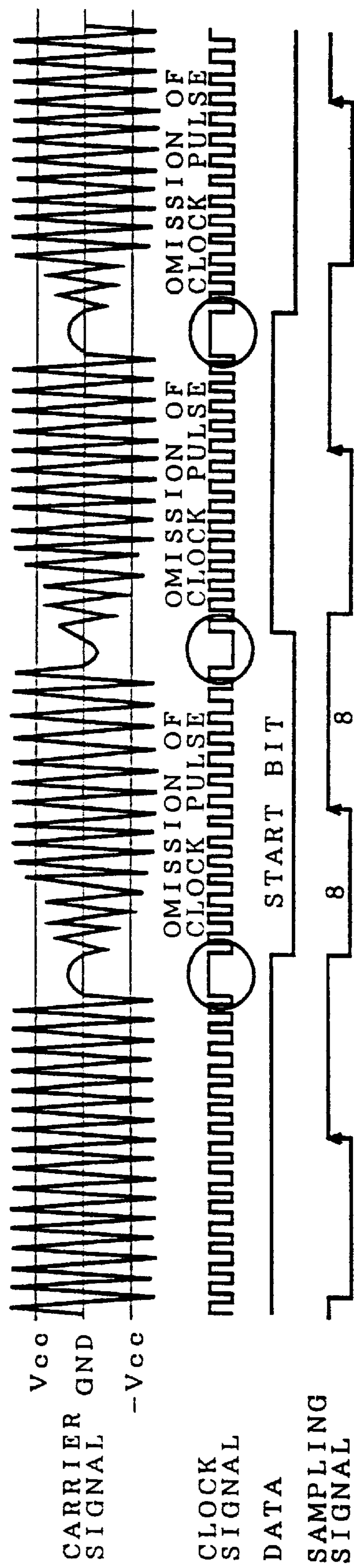
FIG. 13 illustrates examples of a carrier signal which is input to a demodulating circuit, a clock signal which is output by a comparator, data which are output by the demodulating circuit, and a sampling signal which is output by a baud rate generator, in the prior art non-contact IC card.

Referring now to FIG. 9, there is illustrated the structure of the non-contact IC card 600*b* having of generating a demodulation stop signal as shown in FIG. 8. In the figure, reference numeral 695 denotes a demodulation stop signal generating circuit (a demodulation stop signal generating unit) for generating the demodulation stop signal from the clock signal, 620*b* denotes a demodulating circuit (a demodulating unit), responsive to the demodulation stop signal from the demodulation stop signal generating circuit 695, for temporarily stopping its detecting process of detecting a change in the phase of the carrier signal when the demodulation stop signal is in the "Low" level, and for detecting a change in the phase of the carrier signal when the demodulation stop signal is in the "High" level, and 640*b* denotes a serial/parallel convertor (a sampling signal generating unit and a sampling unit), which is identical to the serial/parallel convertor 640*a* shown in FIG. 5, except that the serial/parallel convertor 640*b* does not function to output the sampling signal. The same elements as those shown in FIG. 5 are designated by the same reference numerals, and a duplicated description about these elements will be omitted. In this case, wrong recognition of phase changes can be prevented more effectively compared to the case where the sampling signal is used for stopping the detection of a change in the phase of the carrier signal.

As previously explained, according to the second embodiment, there is provided an advantage that wrong recognition that a phase change in the carrier signal, which is actually a disturbance caused by a noise or the like, has been caused by a phase modulation can be prevented and hence data transmission can be carried out precisely.

Referring now to FIG. 10, there is illustrate a block diagram showing the structure of a non-contact IC card communications system according to a third embodiment of the present invention. In the figure, reference numeral 600*c* denotes a non-contact IC card (a communications device), 620*c* denotes a demodulating circuit (a demodulating unit) for performing a demodulation operation on a BPSK signal, and 640*c* denotes a serial/parallel convertor (a sampling signal generating unit and a sampling unit) functioning to output a sampling signal to the demodulating circuit 620*c*. The same elements as those shown in FIG. 1 are designated by the same reference numerals, and therefore a duplicated description about these elements will be omitted. Like the above-mentioned demodulating circuit 620 according to the first embodiment of the present invention, the demodulating circuit 620*c* delivers a reset signal to the serial/parallel convertor 640*c* when the demodulating circuit detects a change in the phase of the carrier signal. When the serial/parallel convertor 640*c* receives the reset signal, it resets its frequency dividing process for the clock signal to regenerate a sampling signal set to be in its initial state. Like the above-mentioned demodulating circuit 620*a* according to the second embodiment of the present invention, the demodulating circuit 620*c* is provided with a function of temporarily stopping the detecting process of detecting a change in the phase of the carrier signal during the whole time the sampling signal output from of the serial/parallel convertor 640*c* is in the "Low" state. As previously explained with reference to FIG. 9 of the second embodiment, instead of the above-mentioned function of temporarily stopping the detecting process of detecting a change in the phase of the carrier signal, the non-contact IC card can be provided with a function of temporarily stopping the detecting process of detecting a change in the phase of the carrier signal by generating a demodulation stop signal from the clock signal and delivering it to the demodulating circuit 620*c*. That is, the non-contact IC card according to the third embodiment corresponds to a combination of the non-contact IC card according to the first embodiment and non-contact IC card according to the second embodiment.

As previously explained, according to the third embodiment of the present invention, there is provided an advantage that data transmission is carried out precisely even if an omission of a clock pulse takes place successively. Furthermore, another advantage is that wrong recognition that a phase change in the carrier signal, which is actually a disturbance caused by a noise or the like, has been caused by a phase modulation can be prevented.

It should be noted that the present invention is not limited to the above-mentioned non-contact IC cards according to the first, second, and third embodiments. The present invention can be applied not only to such non-contact IC cards, but also a communications device provided with a receiving unit which can generate a clock signal used for the internal operation of the device from the carrier signal transmitted from outside the device and can demodulate the carrier signal to extract digital data carried by the carrier.

As previously mentioned, the present invention offers the following advantages.

In accordance with a preferred embodiment of the present invention, since the sampling signal generating unit is so constructed as to reset its frequency dividing process to restart the process of dividing the frequency of the clock signal from its initial state to generate a sampling signal when the sampling signal generating unit receives a signal indicating a change in the phase of the carrier signal from the demodulating unit, there is provided an advantage that data transmission errors hardly occur even if an omission of a clock pulses occurs successively and hence data transmission can be carried out precisely.

In accordance with a preferred embodiment of the present invention, since the sampling unit is adapted to sample a predetermined number bits of data, and after that convert them into parallel signals, there is provided an advantage that conversion to parallel signals can be carried out precisely.

In accordance with another preferred embodiment of the present invention, the demodulating unit is adapted to stop the detection of a change in the phase of the carrier signal in a predetermined time period encompasing a time from when a predetermined time elapses after the demodulating unit has received the starting point of each bit of the data carried by the carrier signal until the demodulating unit receives the starting point of the next bit of the data carried by the carrier signal. Thus, in a time period except the predetermined time period, the demodulating unit demodulates the carrier signal received by detecting a change in the phase of the carrier signal so that it extracts the data from the carrier signal. Therefore, there is provided an advantage that wrong recognition that a change in the phase of the carrier signal, which is actually a disturbance, has occurred due to a phase modulation can be prevented and hence data transmission can be carried out precisely.

In accordance with a preferred embodiment of the present invention, since the demodulating unit is adapted to determine the predetermined period during which the detection of a change in the phase of the carrier signal is stopped, in accordance with the sampling signal, there is provided an advantage that wrong recognition that a change in the phase of the carrier signal, which is actually a disturbance, has occurred due to a phase modulation can be prevented without having to generate a special signal and hence data transmission can be carried out precisely.

In accordance with a preferred embodiment of the present invention, since the demodulating unit is adapted to determine the predetermined period during which the detection of a change in the phase of the carrier signal is stopped, in accordance with a signal generated by the demodulation stop signal generating unit, there is provided an advantage that the period during which the detection of a change in the phase of the carrier signal is stopped can be determined more accurately and hence data transmission can be carried out precisely.

In accordance with a preferred embodiment, since the sampling signal generating unit is adapted to reset the frequency dividing process to restart the process of dividing the frequency of the clock signal from its initial state to generate a sampling signal when the sampling signal generating unit receives the signal indicating a change in the phase of the carrier signal from the demodulating unit, there is provided an advantage that data transmission errors hardly occur even if an omission of a clock pulse occurs successively and hence data transmission can be carried out precisely.

In accordance with a preferred embodiment of the present invention, since the sampling signal generating unit is provided with a plurality of flip flops connected in series for dividing the frequency of the clock signal, and wherein the plurality of flip flops are reset to restart the process of dividing the frequency of the clock signal from its initial state to generate a sampling signal when the sampling signal generating unit receives the signal indicating a change in the phase of the carrier signal from the demodulating unit, there is provided an advantage that data transmission errors hardly occur even if an omission of a clock pulse occurs successively and hence data transmission can be carried out precisely.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communications device for demodulating a carrier signal which has been modulated with data to be transmitted thereto, by changing the phase of the carrier signal intermittently according the data to extract the data from the carrier signal, said device comprising:

receiving means for receiving the carrier signal modulated with the data;

clock generating means for generating a clock signal for internal operations of said communications device from the received carrier signal;

demodulating means for demodulating the received carrier signal to extract data from the carrier signal and output the data, and when the phase of the carrier signal is varied, to output a signal indicating a change in the phase of the carrier signal;

sampling signal generating means for generating a sampling signal to sample the data by dividing the frequency of the clock signal generated by said clock generating means, and for resetting the frequency dividing process to restart the process of dividing the frequency of the clock signal from an initial state of said sampling signs generating means to generate a sampling signal when said sampling signal generating means receives the signal indicating a change in the phase of the carrier signal from said demodulating means; and sampling means for sampling the data delivered by said demodulating means in accordance with the sampling signal.

2. The communications device according to claim 1, wherein said sampling means samples a predetermined number of bits of data and converts them into parallel signals.

3. The communications device according to claim 1, wherein said sampling signal generating means includes a plurality of flip flops connected in series for dividing the frequency of the clock signal, and wherein said sampling signal generating means resets said plurality of flip flops to restart the process of dividing the frequency of the clock signal from an initial state of said sampling signal generating means to generate a sampling signal when said sampling signal generating means receive the signal indicating a change in the phase of the carrier signal from said demodulating means.

4. A communications device for demodulating a carrier signal, modulated with data and transmitted to said communications device, by changing the phase of the carrier signal intermittently in accordance with the data, to extract the data from the carrier signal, said communications device comprising:

receiving means for receiving the carrier signal modulated with the data;

clock generating means for generating a clock signal, for internal operations of said communications device, from the received carrier signal;

demodulating means for demodulating the received carrier signal by detecting a change in the phase of the carrier signal, thereby extracting the data from the carrier signal and outputting the data, said demodulating means stopping the detection of a change in the phase of the carrier signal in a time period after said demodulating means has received a starting point of a bit of the data carried by the carrier signal until said demodulating means receives a starting point of the next bit of the data carried by the carrier signal;

sampling signal generating means for generating a sampling signal by dividing the frequency of the clock signal generated by said clock generating means, said sampling signal generating means including a plurality of flip-flops connected in series for dividing the frequency of the clock signal and resetting said plurality of flip-flops to restart dividing the frequency of the clock signal from an initial state of said sampling signal generating means, generating the sampling signal when said sampling signal generating means receives a signal indicating a change in the phase of the carrier signal from said demodulating means; and sampling means for sampling the data delivered by said demodulating means in accordance with the sampling signal, wherein said demodulating means determines the time period in accordance with the sampling signal.

5. A communications device for demodulating a carrier signal, modulated with data and transmitted to said communications device, by changing the phase of the carrier signal intermittently in accordance with the data, to extract the data from the carrier signal, said communications device comprising:

receiving means for receiving the carrier signal modulated with the data;

clock generating means for generating a clock signal, for internal operations of said communications device, from the received carrier signal;

demodulating means for demodulating the received carrier signal by detecting a change in the phase of the carrier signal thereby extracting the data from the carrier signal and outputting the data, said demodulating means stopping the detection of a change in the phase of the carrier signal in a time period after said demodulating means has received a starting point of a bit of the data carried by the carrier signal until said demodulating means receives a starting point of the next bit of the data carried by the carrier signal;

sampling signal generating means for generating a sampling signal by dividing the frequency of the clock signal generated by said clock generating means, said sampling signal generating means resetting frequency dividing and restarting dividing of the frequency of the clock signal from an initial state of said sampling signal generating means, and generating a sampling signal when said sampling signal generating means receives a signal indicating a change in the phase of the carrier signal from said demodulating means; and sampling means for sampling the data delivered by said demodulating means in accordance with the sampling signal, wherein said demodulating means determines the time period in accordance with the sampling signal.

6. A communications device for demodulating a carrier signal, modulated with data and transmitted to said communications device, by changing the phase of the carrier signal intermittently in accordance with the data, to extract the data from the carrier signal, said communications device comprising;

receiving means for receiving the carrier signal modulated with the data;

clock generating means for generating a clock signal, for internal operations of said communications device, from the received carrier signal:

demodulating means for demodulating the received carrier signal by detecting a change in the phase of the carrier signal, thereby extracting the data from the carrier signal and outputting the data, said demodulating means stopping the detection of a change in the phase of the carrier signal in a time period after said demodulating means has received a starting point of a bit of the data carried by the carrier signal until said demodulating means receives a starting point of the next bit of the data carried by the carrier signal; and demodulation stop signal generating means for generating a signal indicating a period during which detection of a change in the phase of the carrier signal is to be stopped in response to the clock generated by said clock generating means, said demodulating means determining the period in accordance with the signal generated by said demodulation stop signal generating means.

* * * * *

UNITED STATES PATENT AND TRADEMARK OFFICE
CERTIFICATE OF CORRECTION

PATENT NO. : 5,864,588
DATED : January 26, 1999
INVENTOR(S) : Taiyuu Miyamoto

It is certified that error appears in the above-identified patent and that said Letters Patent is hereby corrected as shown below:

Column 12, Line 11, after "according" insert --to--;

Line 30, change "signs" to --signal--.

Line 50, change "receive" to --receives--.

Signed and Sealed this

Twentieth Day of July, 1999

*Attest:*

Q. TODD DICKINSON

*Attesting Officer*

*Acting Commissioner of Patents and Trademarks*